Jan. 21, 1941. J. E. HAGAN 2,229,564
AIRPLANE PROPULSION
Filed May 31, 1939 2 Sheets-Sheet 1
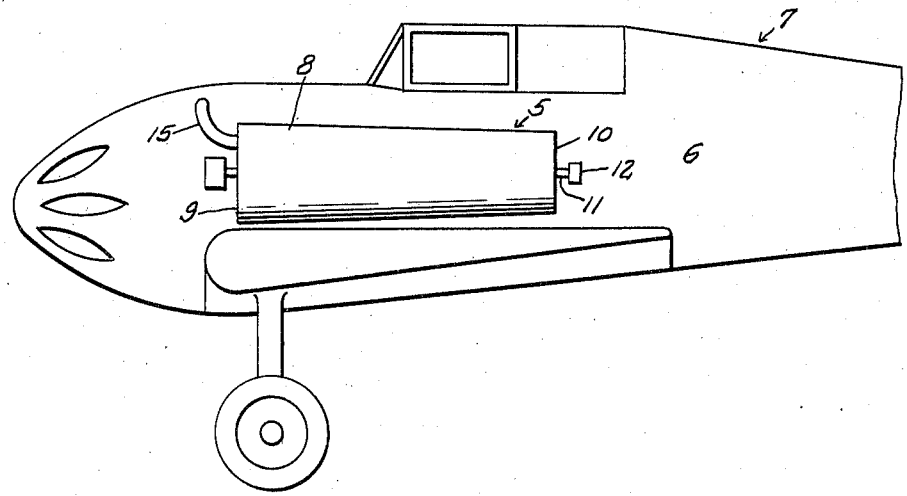
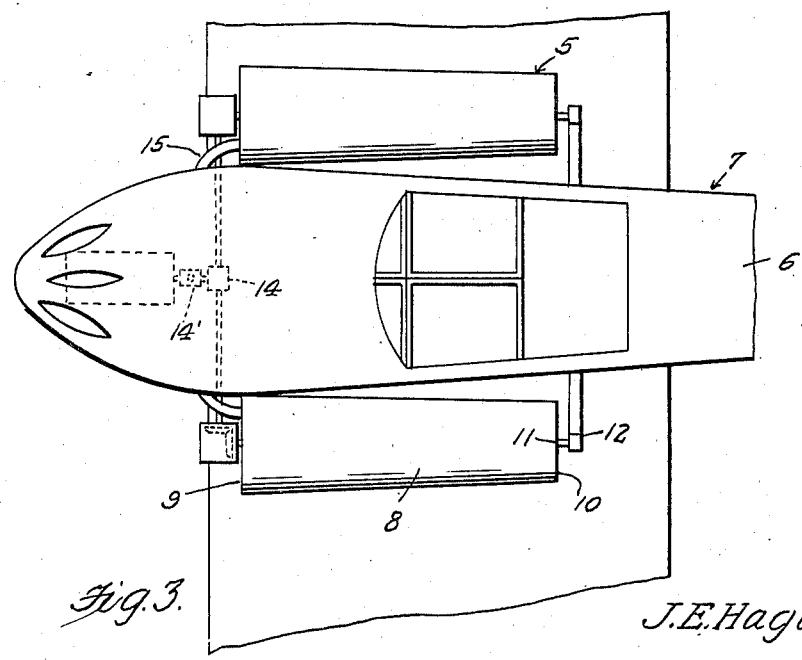
Inventor
J. E. Hagan.
By Clarence A. O'Brien
and Hyman Berman
Attorneys

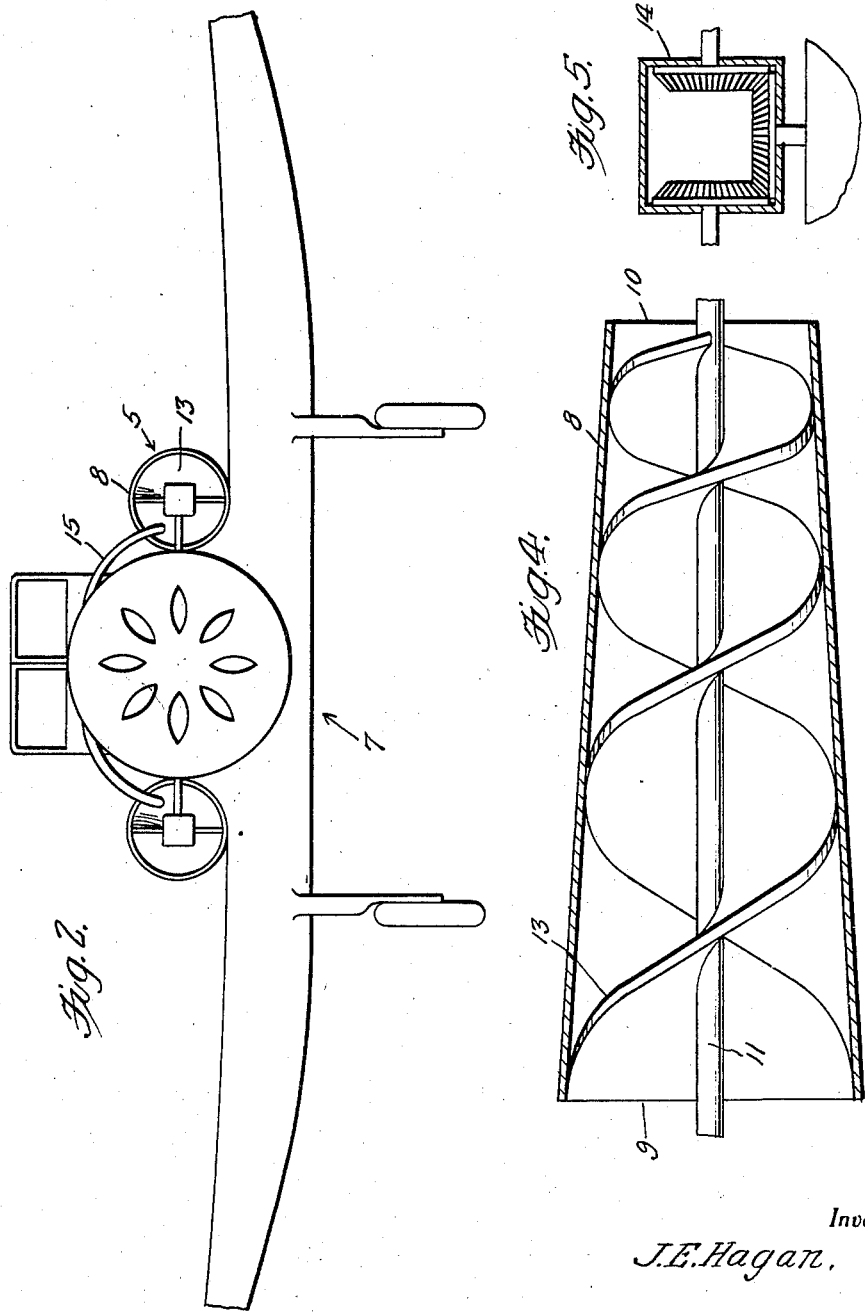

Patented Jan. 21, 1941

2,229,564

UNITED STATES PATENT OFFICE 2,229,564

AIRPLANE PROPULSION

James E. Hagan, Hazard, Ky.

Application May 31, 1939, Serial No. 276,721

1 Claim. (Cl. 244—15)

This invention relates to airplane propulsion, and has for the primary object the provision of a device of the character herein described which will materially increase the efficiency of an airplane both when taking off and when in flight and will greatly increase the safety of the airplane over the present type of propeller construction now in use and which will be quieter in operation.

Another object of this invention is the provision of a turbine type of propeller which may be easily mountable on an airplane either above or below the wings and parallel and in close relation to the body of said airplane so as to occupy a minimum amount of space and includes a cylindrical stator tapering from the front or air receiving end to the rear or discharge end thereof and a rotor including spirally formed blades wherein the pitch of the blades gradually decreases from the front end of the stator to the rear end thereof which with the taper of the stator provides for increased power and efficiency.

A further object of this invention is the convenience in which this type of propeller may be geared to the power source of the airplane for different speeds, so that the propeller may be driven at high speed in heavy atmosphere and driven at low speed in rare or high atmosphere and thereby permit the R. P. M. of the power source to be reduced after reaching high altitude.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating an airplane having mounted thereon a turbine type of propeller constructed in accordance with my invention.

Figure 2 is a fragmentary front elevation illustrating the airplane showing the use of a pair of turbine type of propellers thereon which are in accordance with the present invention.

Figure 3 is a fragmentary top plan view showing the turbine type of propellers on the airplane.

Figure 4 is a vertical sectional view illustrating one of the propellers.

Figure 5 is a detail sectional view illustrating a gearing mechanism for the drive of the propellers from the power source of the airplane.

It is to be understood that the present invention is applicable to various types of airplanes and it may be applied above or below the wings of the airplane depending which is most suitable for the type of airplane to which the device is adapted. Further, it is to be understood that one or more turbine type propellers may be used in conjunction with the airplane.

For convenience of description and illustration of this invention I have elected to show the application of a pair of turbine type propellers designated by the character 5 mounted on opposite sides of the body 6 of an airplane 7 above the wings with the turbine type of propellers extending longitudinally of the airplane or paralleling opposite sides of the body and in close relation thereto. Through the use of a suitable gearing and shaft mechanism, as shown at 14, the turbine type of propellers may be connected to the power source of the airplane whereby the propellers may be driven at different speeds.

Each turbine type of propeller includes an elongated tubular stator 8 having a forward end 9 and a rear end 10. The forward end is the air intaking end of the stator while the rear end is the discharge end for the air. The stator 8 gradually tapers from the forward end to its rear end.

A shaft 11 is arranged concentrically of the stator, being supported by suitable bearings 12, and has thereon one or more spirally formed blades 13. The blades 13 as shown in Figure 4, gradually have the pitch thereof decreased from the forward end of the stator to the rear end. It is preferable that the blades extend substantially the full length of the stator, this also being clearly shown in Figure 4. It is to be understood that the shaft 11 is connected with a gearing mechanism 14, as shown in Figure 5, so that the shaft may be rotated at different speeds by the engine of the airplane.

The type of transmission to provide the variable speeds to the propeller blades may be of any desired type or character as indicated generally by the character 14' located within the body of the airplane and geared to the shafts of the propellers, as at 14.

As shown in Figures 1 and 2 the exhaust pipes 15 of the engine of the airplane may terminate within the forward ends of the stators so that the exhaust entering the stators will heat them and prevent accumulation of ice thereon.

The blades of the turbine type propellers as heretofore described having the pitch varying from the air receiving end to the discharge end of the stator and with the stator tapering from the forward end to the rear end will be found to operate extremely successfully both in rare or heavy atmosphere and will efficiently speed up and compress the air more and more as it goes through the turbine or the stators thereof so that the air on leaving the turbine is traveling at a very rapid rate of speed consequently permitting the maximum amount of power of the engine of the airplane to be fully utilized in the propulsion of the airplane.

Propellers of the type described and shown will operate with less noise, may be made more compact and are less dangerous due to the convenient way in which they are mountable on the airplane and the mounting permitting the directing of the exhaust of the engine therein to lessen the formation of ice on the blades of the stator tending to increase the efficiency of the device to the utmost.

It is believed that the foregoing description when taken in connection with the drawings will fully set forth the construction and advantages of my invention to those skilled in the art to which such a device relates, so that further detailed description will not be required.

Having described my invention, what I claim is:

In combination with an airplane including a power source having exhaust pipes, elongated tubular stators mounted horizontally on the exterior of the airplane and at each side thereof above and adjacent to the wings of the airplane and tapering from the air receiving ends to the air discharge ends, spirally formed blades journaled in the stators and having the pitch thereof gradually decreasing from the air receiving ends to the air discharge ends of the stators, variable transmission means for connecting the blades to the engine to be driven at variable speeds, said exhaust pipes extending into the air receiving ends of the stators.

JAMES E. HAGAN.